US012746499B2

(12) United States Patent
Schmid et al.

(10) Patent No.: US 12,746,499 B2
(45) Date of Patent: Sep. 29, 2026

(54) FILTER ELEMENT FOR A FILTER SYSTEM HAVING A RESONATOR STRUCTURE, AND FILTER SYSTEM HAVING A RESONATOR STRUCTURE

(71) Applicant: MANN+HUMMEL GmbH, Ludwigsburg (DE)

(72) Inventors: Daniel Schmid, Sachsenheim (DE); Kevin Kohn, Grossbottwar (DE); Sven Epli, Heilbronn (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 234 days.

(21) Appl. No.: 18/506,613

(22) Filed: Nov. 10, 2023

(65) Prior Publication Data

US 2024/0075419 A1 Mar. 7, 2024

Related U.S. Application Data

(63) Continuation of application No. PCT/EP2022/061697, filed on May 2, 2022.

(30) Foreign Application Priority Data

May 10, 2021 (DE) ..................... 10 2021 112 122.1

(51) Int. Cl.

*B01D 53/02* (2006.01)
*B01D 46/00* (2022.01)

(Continued)

(52) U.S. Cl.

CPC ..... *B01D 46/4236* (2013.01); *B01D 46/0005* (2013.01); *B01D 46/2414* (2013.01); *B01D 2271/027* (2013.01)

(58) Field of Classification Search

CPC ........ B01D 2265/028; B01D 2271/027; B01D 46/0005; B01D 46/2414; B01D 46/4236;

(Continued)

(56) References Cited

U.S. PATENT DOCUMENTS

| | | | |
|---|---|---|---|
| 5,112,372 A | 5/1992 | Boeckermann et al. | |
| 5,349,141 A * | 9/1994 | Horibe .............. | F02M 35/1266 181/227 |

(Continued)

FOREIGN PATENT DOCUMENTS

| | | |
|---|---|---|
| DE | 10020538 A1 | 10/2001 |
| DE | 10110029 A1 | 9/2002 |

(Continued)

OTHER PUBLICATIONS

Translation of Jp H0730358; Mitsubishi Motors Corp (Year: 1995).*

(Continued)

*Primary Examiner* — Christopher P Jones

(57) ABSTRACT

A filter element for a filter system has a hollow cylinder-type filter bellows with an end face and a substantially closed bottom provided thereat. At least one resonator structure provided at the bottom provides noise attenuation of a flowing fluid. The resonator structure has two or more grooves arranged at an outer side of the bottom and separated from each other by a partition. At least one of the grooves is connected in fluid communication through an opening to an interior of the filter element. The resonator structure, when installed in a filter housing of the filter system as intended, seals tightly relative to a complementary resonator structure of the filter housing. The grooves are connected in fluid communication through connection openings arranged in the resonator structure of the filter element (Continued)

and/or the complementary resonator structure of the filter housing. A filter system with such a filter element is provided.

21 Claims, 6 Drawing Sheets

(51) Int. Cl.
*B01D 46/24* (2006.01)
*B01D 46/42* (2006.01)

(58) Field of Classification Search
CPC ......... F02M 35/0201; F02M 35/02416; F02M 35/02483; F02M 35/1255; F02M 35/1283; F02M 35/14
See application file for complete search history.

(56) References Cited

U.S. PATENT DOCUMENTS

| | | | | |
|---|---|---|---|---|
| 6,419,718 | B1 | 7/2002 | Klug et al. | |
| 2007/0251392 | A1* | 11/2007 | Tschech | F02M 35/10144 96/147 |
| 2013/0263744 | A1 | 10/2013 | Osendorf et al. | |
| 2014/0102304 | A1 | 4/2014 | Bouhanna | |
| 2015/0013542 | A1* | 1/2015 | Hasenfratz | B01D 46/62 55/497 |
| 2016/0129383 | A1* | 5/2016 | Volk | F02M 35/02483 96/135 |
| 2017/0319997 | A1* | 11/2017 | Jerger | B01D 46/2414 |
| 2022/0126232 | A1 | 4/2022 | Ribeiro et al. | |
| 2022/0134270 | A1* | 5/2022 | Verstraete | B01D 46/527 96/421 |
| 2022/0145836 | A1 | 5/2022 | Ribeiro et al. | |
| 2024/0075418 | A1* | 3/2024 | Schmid | F02M 35/0201 |

FOREIGN PATENT DOCUMENTS

| | | | |
|---|---|---|---|
| DE | 102019210078 | A1 | 1/2021 |
| EP | 1297880 | A1 | 4/2003 |
| GB | 1315163 | A | 4/1973 |
| JP | H051850 | U | 1/1993 |
| JP | H0730358 | U | 6/1995 |
| WO | 9937906 | A1 | 7/1999 |
| WO | 9946501 | A1 | 9/1999 |

OTHER PUBLICATIONS

International Search Report in corresponding International Appln. No. PCT/EP2022/061697, Sep. 9, 2022, Rijswijk, Netherlands.

* cited by examiner

FILTER ELEMENT FOR A FILTER SYSTEM HAVING A RESONATOR STRUCTURE, AND FILTER SYSTEM HAVING A RESONATOR STRUCTURE

CROSS-REFERENCE TO RELATED APPLICATIONS

This application is a continuation application of international application No. PCT/EP2022/061697 having an international filing date of 2 May 2022 and designating the United States, the international application claiming a priority date of 10 May 2021 based on prior filed German patent application No. 10 2021 112 122.1 the entire contents of the aforesaid international application and the aforesaid German patent application being incorporated herein by reference.

BACKGROUND OF THE INVENTION

The invention concerns a filter element for a filter system having a resonator structure for noise attenuation of a flowing fluid and a filter system having a resonator structure having such a filter element, in particular for an air conducting system of an internal combustion engine, in particular of a motor vehicle.

DE 101 10 029 A1 discloses an annular filter insert for an intake air filter in which a resonator chamber is integrated. The integration of the resonator chamber is realized in that one of the end disks of the filter element comprises the resonator chamber or is configured as such, wherein the resonator chamber communicates through an opening with the interior of the filter element and otherwise is closed. The resonator chamber is configured as a so-called Helmholtz resonator. In one embodiment, the resonator chamber is attached as separate component to the associated end disk.

SUMMARY OF THE INVENTION

It is an object of the invention to provide a filter element for a filter system having a resonator structure for noise attenuation of a flowing fluid which can be produced inexpensively.

A further object is providing a filter system having such a filter element having a resonator structure for noise attenuation of a flowing fluid which can be produced inexpensively.

The aforementioned object is solved according to an aspect of the invention by a filter element for a filter system, comprising a hollow cylinder-type filter bellows, wherein the filter element comprises at an end face a substantially closed bottom, wherein at least one resonator structure at the element for noise attenuation of a flowing fluid is embodied at the bottom, wherein the resonator structure at the element comprises at least two grooves, separated from each other by a partition, at the outer side of the bottom, wherein at least one of the two grooves at the element is connected in fluid communication through an opening to the interior of the filter element, wherein the resonator structure at the element, upon installation in a filter housing of the filter system as intended, seals tightly relative to a resonator structure at the housing embodied complementary thereto, wherein the two grooves at the element are connected in fluid communication by connection openings arranged in the resonator structure at the element and/or the resonator structure at the housing.

The further object is solved by a filter system having an exchangeable filter element and a filter housing, wherein the filter element comprises a hollow cylinder-type filter bellows and a substantially closed bottom arranged at an end face, wherein at least one resonator structure at the element for noise attenuation of a flowing fluid is embodied at the bottom, wherein the resonator structure at the element comprises two grooves separated from each other by a partition, wherein at least one of the two grooves is connected through an opening to the interior of the filter element, wherein the filter housing comprises at least a housing top part and a housing bottom part, wherein a resonator structure at the housing is embodied at an inner side of the housing bottom part, is complementary to the resonator structure at the element, and comprises two grooves separated from each other by a partition, wherein, upon assembly of the filter system as intended, the resonator structure at the element seals tightly relative to the resonator structure at the housing, wherein the grooves at the element and the grooves at the housing of at least one of the two resonator structures are connected in fluid communication through connection openings in at least one of the partitions.

Beneficial embodiments and advantages of the invention result from the additional claims, the description, and the drawing.

According to an aspect of the invention, a filter element for a filter system is proposed, comprising a hollow cylinder-type filter bellows, wherein the filter element comprises at an end face a substantially closed bottom, wherein at least one resonator structure at the element for noise attenuation of a flowing fluid is embodied at the bottom. The resonator structure at the element comprises at least two grooves, separated from each other by a partition, at the outer side of the bottom, wherein at least one of the two grooves at the element is connected in fluid communication through an opening to the interior of the filter element. Upon installation in a filter housing of the filter system as intended, the resonator structure at the element seals tightly relative to a resonator structure at the housing which is complementary thereto, wherein the two grooves at the element are connected in fluid communication by connection openings arranged in the resonator structure at the element and/or the resonator structure at the housing.

Advantageously, for noise attenuation of a flowing fluid when passing through the filter element of an air conducting system or of the filter housing of a filter system, the resonator structure comprises two parts, a resonator structure at the element and a resonator structure at the housing. With such an arrangement, a so-called parallel-connected resonator can be produced in an advantageous manner which comprises two volumes which are acoustically coupled through connection openings, for example, slots, in a partition between the two volumes.

The connection openings, for example, slots, can be present in the resonator structure at the element, the resonator structure at the housing, or in both resonator structures.

The hollow cylinder-type filter bellows comprises a closed circumferential wall surrounding a longitudinal axis and can comprise an arbitrary cross section. The cross section of the filter bellows can be circular, rectangular, triangular, polygonal, oval or the like and can be adapted beneficially to an existing installation space. The filter bellows can comprise a folded filter medium or wound layers of filter medium. A combination of folded and wound filter media is possible also.

The resonator structure at the element is configured as part of the substantially closed bottom of the filter element and can comprise, for example, two grooves formed in the bottom and separated by a partition. The grooves, for example, can be embodied as flat grooves with almost rectangular cross section. In this way, only little additional installation space is required in the longitudinal axis of the filter element. The resonator structure at the element is connected in fluid communication through an opening to the interior of the filter element.

The resonator structure at the housing is embodied at the inner side of the housing bottom part and can be embodied expediently mirror-symmetrically complementary to the resonator structure at the element. Upon installation of the filter element in the filter housing and closing of the filter housing by the housing bottom part, the two resonator structures interact and form two hollow spaces which are separated by partitions and which enable a certain fluid exchange with each other for noise attenuation through connection openings in the partitions. Thus, the actual resonator is formed by the two resonator structures matching each other only once the filter system is assembled.

The sealing action of the two resonator structures can be realized by a suitable sealing material, for example, polyurethane (PUR), which is usually employed for producing an end disk of such a filter element by foaming PUR foam onto the bottom of the filter element. In this manner, the sealing action can be achieved easily and reliably, and no additional production steps are required. However, separate tied-in or fitted seals can be used also as an alternative.

Such a resonator can be realized in very limited installation space and can be produced inexpensively.

According to a beneficial embodiment of the filter element, a central tube can comprise the bottom and can be arranged with the bottom about a longitudinal axis in the interior of the filter bellows. In this manner, the resonator structure at the element can be embodied as a part of the central tube of the filter element and can comprise, for example, two grooves formed in the bottom of the central tube.

According to a beneficial embodiment of the filter element, the resonator structure at the element can be integrated in an end face end disk. The resonator structure at the element can be formed beneficially in the bottom of the filter element, which can be embodied, for example, as bottom of the central tube, and realized when producing the end disk by foaming PUR about the bottom, integrated with the suitable sealing action for the assembly with the resonator structure at the housing.

According to a beneficial embodiment of the filter element, the end disk can comprise a seal structure for sealing the resonator structure at the element relative to the resonator structure at the housing upon installation in the filter housing as intended. The PUR foam which is used for producing the end disk can advantageously enable a sealing action for the assembly with the resonator structure at the housing. In this way, a seal structure laterally surrounding the resonator structure at the element can be produced in a simple manner. Even for an irregularly shaped resonator structure, an effective sealing action of the two grooves relative to each other and to the environment can be achieved in this way. The seal structure can thus be formed expediently areally at the end face of the end disk. Alternatively, the seal structure can be embodied as a separate tied-in or fitted seal in the cover of the filter system.

According to a beneficial embodiment of the filter system, the two grooves at the element can be embodied as segments arranged adjacent to each other, for example, circular ring segments. In particular, one of the two grooves can at least partially surround the other one of the two grooves in this context. With such an arrangement, the two grooves can be accommodated in a space-saving manner at the bottom of the filter element and still make available sufficient volume for noise attenuation. This is beneficial in case of a hollow cylinder-type filter element.

According to a beneficial embodiment of the filter system, the opening to the interior can be arranged in at least one of the two grooves. In this way, a beneficial connection of the interior of the filter element to a sufficiently large volume for noise attenuation can be produced.

According to a beneficial embodiment of the filter element, the partition can comprise one or a plurality of connection openings between the two grooves, in particular one or a plurality of axially extending slots in the partition. By means of the connection openings, a beneficial acoustic coupling of the two volumes available for the resonator structure can be achieved. The noise attenuation can thus be effectively improved.

According to a further aspect of the invention, a filter system with an exchangeable filter element and a filter housing is proposed, wherein the filter element comprises a hollow cylinder-type filter bellows and a substantially closed bottom at an end face. At the bottom, at least one resonator structure at the element for noise attenuation of a flowing fluid is embodied, wherein the resonator structure at the element comprises two grooves separated by a partition from each other, wherein at least one of the two grooves is connected through an opening to the interior of the filter element. The filter housing comprises at least a housing top part and a housing bottom part, wherein a resonator structure at the housing, which is complementary to the resonator structure at the element and which comprises two grooves separated from each other by a partition, is embodied at an inner side of the housing bottom part. For assembly of the filter system as intended, the resonator structure at the element seals tightly relative to the resonator structure at the housing, wherein the grooves at the element and the grooves at the housing of at least one of the two resonator structures are connected in fluid communication through connection openings in at least one of the partitions.

Advantageously, the resonator structure comprises two parts, a resonator structure at the element and a resonator structure at the housing, for noise attenuation of a flowing fluid when passing through the filter element or the filter housing of the filter system. With such an arrangement, a so-called parallel-connected resonator can be realized in an advantageous manner which comprises two volumes connected by connection openings, for example, slots, in a partition between the two volumes for acoustic coupling.

The resonator structure at the element is embodied as part of the bottom of the filter element and can comprise, for example, two grooves embodied in the bottom which are separated by a partition. The grooves can be, for example, embodied as flat grooves with an almost rectangular cross section. In this way, only little additional installation space is required in longitudinal axis of the filter element. The resonator structure at the element is connected in fluid communication through an opening to the interior of the filter element.

The resonator structure at the housing is embodied at the inner side of the housing bottom part and can be embodied expediently mirror-symmetrically complementary to the resonator structure at the element. Upon installation of the filter element in the filter housing and closing of the filter housing by the housing bottom part, the two resonator structures interact and form two hollow spaces which are separated by partitions and which enable through connection openings in the partitions a certain fluid exchange with each other for noise attenuation. In this way, the actual resonator is formed by the two resonator structures matching each other only once the filter system is assembled.

The sealing action of the two resonator structures can be realized by a suitable sealing material, for example, polyurethane (PUR), which is usually employed for producing an end disk of such a filter element by foaming onto the bottom of the filter element. In this manner, the sealing action can be achieved easily and reliably, and no additional production steps are required.

Such a resonator can be realized in a very limited installation space and can be produced inexpensively.

According to a beneficial embodiment of the filter system, the connection openings can be formed as axially extending slots in the partition of the resonator structure at the element and/or the resonator structure at the housing. By means of the connection openings, a beneficial acoustic coupling of the two volumes available for the resonator structure can be achieved. The noise attenuation can thus be effectively improved.

According to a beneficial embodiment of the filter system, the two grooves of the resonator structure at the housing can be embodied as segments arranged adjacent to each other, in particular circular ring segments. In particular, one of the two grooves can at least partially surround the other one of the two grooves in this context. With such an arrangement, the two grooves can be accommodated in a space-saving manner at the bottom of the filter element and can still make available sufficient volume for noise attenuation.

According to a beneficial embodiment of the filter system, one of the two grooves of the resonator structure at the housing can surround at least partially the other one of the two grooves. In this way, the available installation space at the end disk can be beneficially utilized. The partition between the two grooves can thus reach a beneficial length in order to arrange connection openings for acoustic coupling between the two volumes.

According to a beneficial embodiment of the filter system, the housing bottom part can comprise an outlet of the resonator structure at the housing for purified air. In particular, the outlet can be connected in fluid communication to at least one of the two grooves of the resonator structure at the housing in this context. Through the outlet, for example, an advantageous coupling to an air connector of a compressor can be realized for the noise attenuation. The purified air can be used, for example, in a further system which requires purified air, for example, in a brake system for commercial vehicles or the like.

According to a beneficial embodiment of the filter system, the partition at the housing can comprise one or a plurality of connection openings between the grooves, in particular one or a plurality of axially extending slots. By means of the connection openings, a beneficial acoustic coupling of the two volumes made available for the resonator structure can be achieved. The noise attenuation can thus be effectively improved.

According to a beneficial embodiment of the filter system, the two resonator structures can be sealed in relation to the interior of the filter system upon assembly as intended by a seal structure arranged at least at one of the two resonator structures. The sealing action of the two resonator structures can be realized by a suitable sealing material, for example, polyurethane (PUR), which is usually employed for producing an end disk of such a filter element by foaming onto the bottom of the filter element. In this manner, the sealing action can be achieved easily and reliably, and no additional production steps are required. The seal structure can be integrated into the end disk or can be embodied as a separate tied-in or fitted seal.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will expediently consider the features also individually and combine them to expedient further combinations.

DESCRIPTION OF PREFERRED EMBODIMENTS

Figure 1:
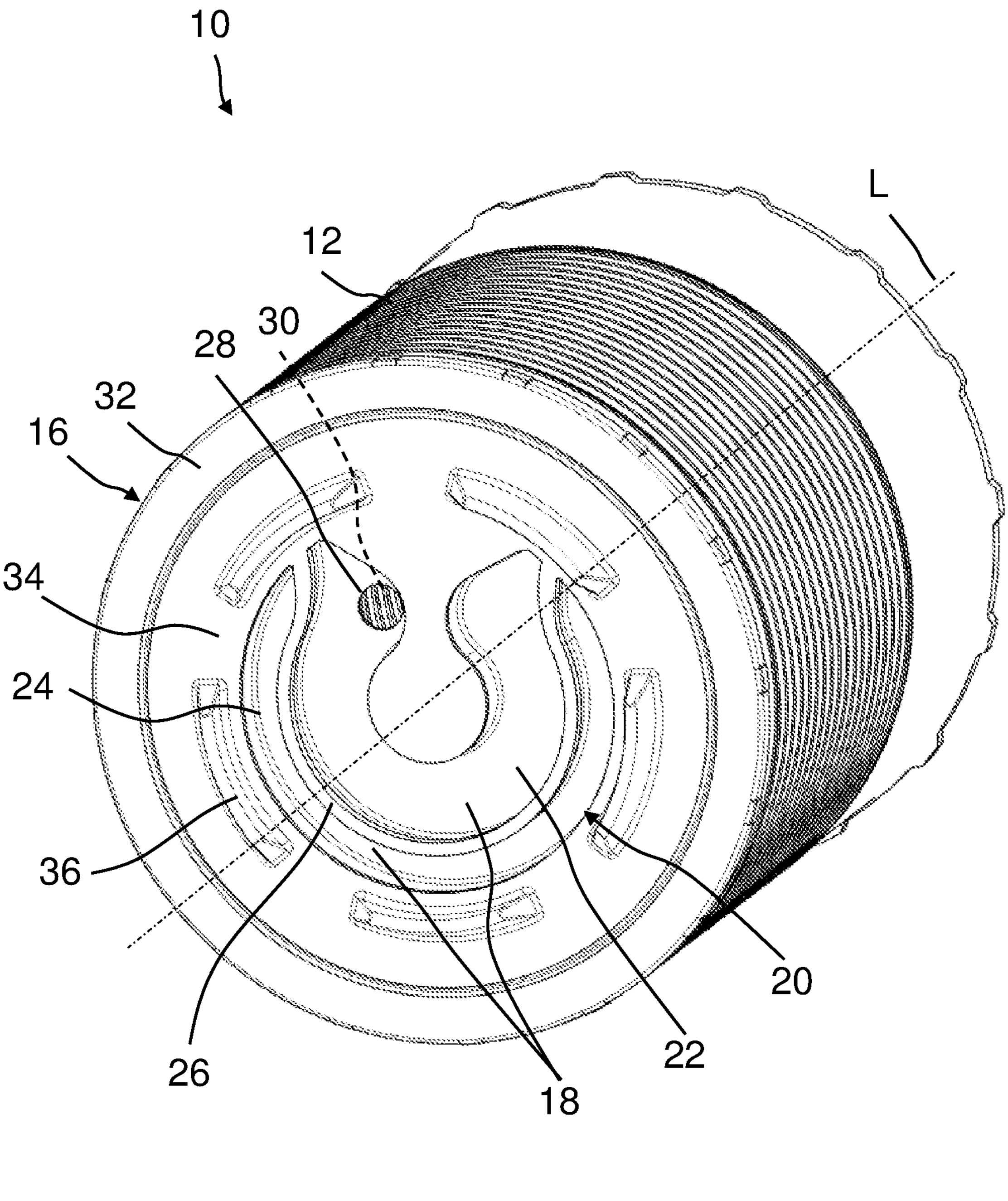
FIG. 1 shows an isometric view of a filter element according to an embodiment in plain view of an end disk with a resonator structure at the element.

In the Figures, same or same-type components are identified with same reference characters. The Figures show only examples and are not to be understood as limiting.

The directional terminology used in the following with terms like Aleft@, Aright@, Atop@, Abottom@, Ain front of@, Abehind@, Aafter@, and the like serve only for better understanding the Figures and is not to represent a limitation of the generality in any case. The illustrated components and elements, their configuration and use can vary in the context of the considerations of a person of skill in the art and be adapted to the respective applications.

FIG. 1 shows an isometric illustration of a filter element 10 according to an embodiment of the invention in plain view of an end disk 32 with a resonator structure 20 at the element.

The filter element 10 comprises a hollow cylinder-type filter bellows 12 with a central tube 14 which is arranged about its longitudinal axis L in the interior of the filter bellows 12 and which at an end face 16 comprises a substantially closed bottom 18. The cross section of the filter bellows can have arbitrary suitable shapes, for example, circular, rectangular, triangular, polygonal, oval or the like. The central tube 14 cannot be seen in FIG. 1 because it is arranged at an inner side of the filter bellows 12. At the bottom 18 of the central tube 14, a resonator structure 20 at the element is embodied for noise attenuation of a flowing fluid, wherein the resonator structure 20 at the element comprises two grooves 22, 24, separated from each other by a partition 26, at the outer side of the bottom 18. One of the two grooves 22, 24 at the element is connected in fluid communication through an opening 28 to the interior 30 of the filter element 10. The opening 28 to the interior 30 is arranged in the radially inwardly positioned one of the grooves 22, 24. As an alternative, the bottom 18 can also be provided as a separate component of the filter element 10 which closes the filter bellows 12 at the end face, wherein the bottom 18 is foamed on as an end disk 32.

In the illustration in FIG. 1, the bottom 18 is directly visible only in the grooves 22, 24 because the bottom 18 of the central tube 14 is usually integrated into the end disk 32 of the filter element 10 which is produced, for example, from PUR foam. The resonator structure 20 at the element can be directly integrated into the end face end disk 32 of the filter element 10 in this manner.

The contour of the two grooves 22, 24 is embodied in the end disk 32 and is surrounded by the areally applied PUR foam as seal structure 34. The end disk 32 comprises thus a seal structure 34 for sealing the resonator structure 20 at the element against the resonator structure 120 at the housing upon installation in the filter housing 110 as intended.

Support elements 36, radially surrounding the grooves 22, 24, are arranged in the end disk 32 for supporting the filter element 10 in the filter housing 110, in particular in the housing bottom part 114. The support elements 36 can be embodied expediently also of PUR foam.

The resonator structure 20 at the element is provided for sealing tightly relative to a resonator structure 120 at the housing (FIG. 3) that is complementary thereto upon installation in a filter housing 110 of the filter system 100 as intended. In this context, the two grooves 22, 24 at the element are connected in fluid communication through connection openings 128 arranged in the resonator structure 20, 120 at the element and/or at the housing.

The two grooves 22, 24 at the element are embodied as concentrically arranged curved segments, for example, circular ring segments. In particular, one of the two grooves 22, 24 surrounds the other one of the two grooves 22, 24 in radial direction at least partially in this manner. As shown in FIG. 1, a first one 22 of the concentrically arranged curved segments may be arranged radially nested inside of a second one 24 of the concentrically arranged curved segments 22, 24, nested apart radially relative to the longitudinal axis L of the filter element 10, such that the second one 24 of the concentrically arranged curved segments at least partially surrounds the first one 22 of the of the concentrically arranged curved segments.

Figure 2:
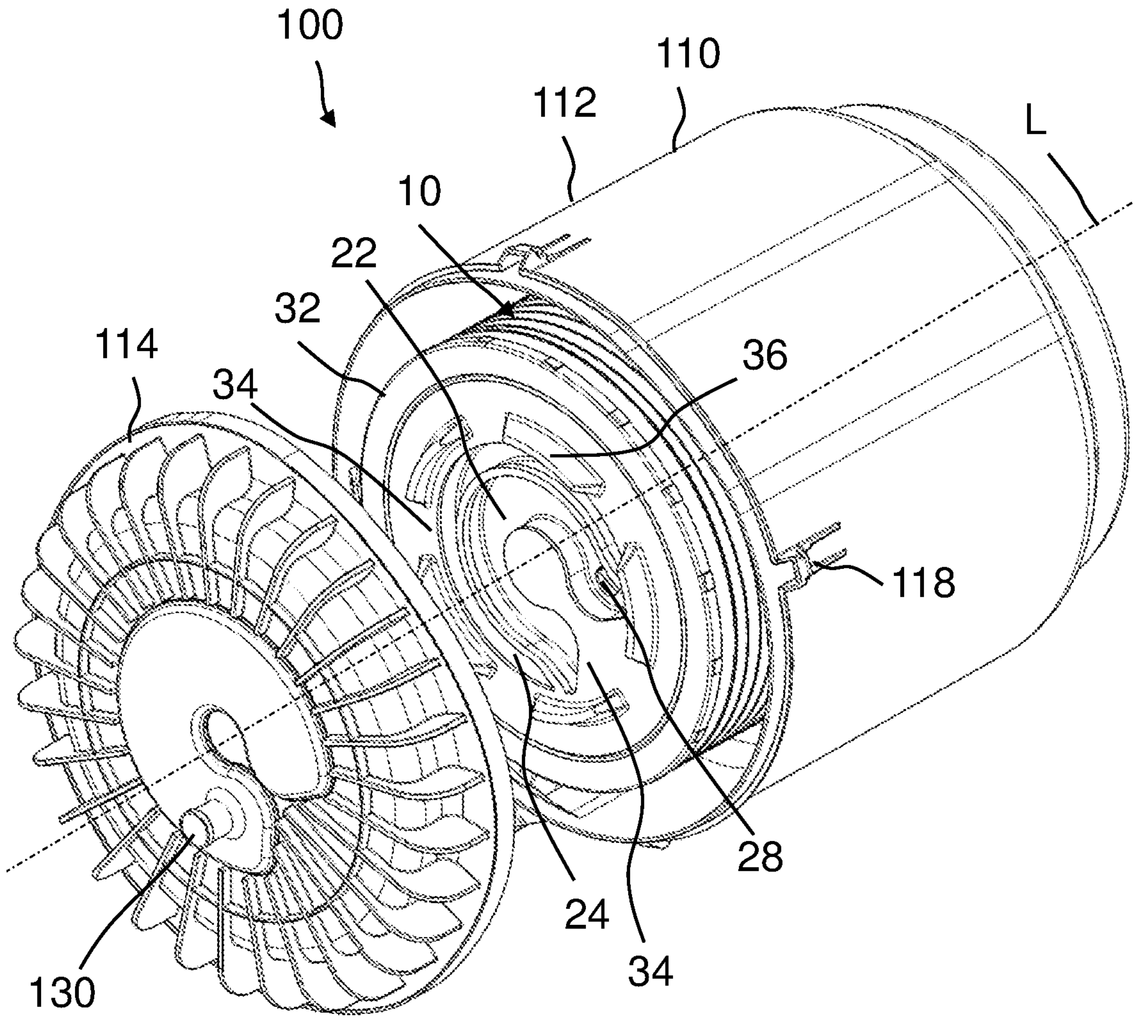
FIG. 2 shows an isometric view of a filter system according to an embodiment with an installed filter element of FIG. 1 with removed housing bottom part.
Figure 3:
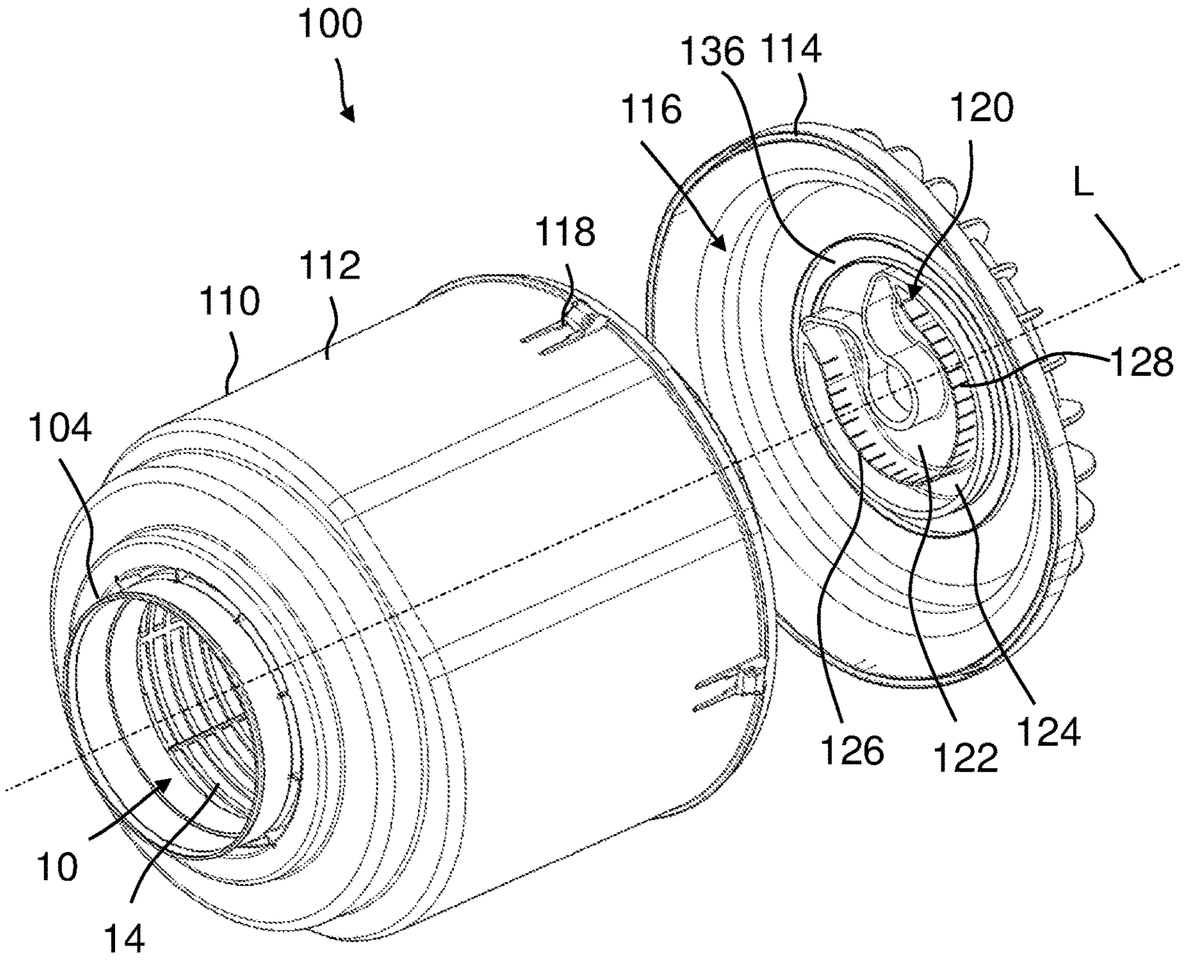
FIG. 3 shows an isometric view of the filter system of FIG. 2 with a view of an inner side of the housing bottom part with a resonator structure at the housing.

FIG. 2 shows an isometric view of a filter system 100 according to an embodiment with an installed filter element 10 with resonator structure 20 at the element of FIG. 1 with removed housing bottom part 114 while in FIG. 3 an isometric view of the filter system 100 is illustrated with a view of an inner side 116 of the housing bottom part 114 with a resonator structure 120 at the housing which is complementary thereto.

The filter system 100 with the exchangeable filter element 10 comprises a filter housing 110 which comprises a housing top part 112, in which the filter element 10 is arranged, and a housing bottom part 114.

At the inner side 116 of the housing bottom part 114, the resonator structure 120 at the housing, which is mirror-symmetrically complementary embodied to the resonator structure 20 at the element, is embodied which comprises two grooves 122, 124 separated from each other by a partition 126. Upon assembly of the filter system 100 as intended, the resonator structure 20 at the element seals tightly relative to the resonator structure 120 at the housing in this way. Upon assembly as intended, the two resonator structures 20, 120 are sealed in relation to the interior 30 of the filter system 100 by the seal structure 34 arranged at the resonator structure 20 at the element and by the surface of the resonator structure 120 at the housing embodied as the counter seal structure 134.

Since the two resonator structures 20, 120 are mirror-symmetrically complementary embodied, the two grooves 122, 124 of the resonator structure 120 at the housing are embodied as concentrically arranged curved segments, for example, circular ring segments. One of the two grooves 124 of the resonator structure 120 at the housing surrounds the other groove 122 in radial direction at least partially.

The grooves 122, 124 of the resonator structure 120 at the housing comprise in this embodiment connection openings 128 in the form of axially extending slots of the partition 126 through which the joined grooves 22, 24, 122, 124 are connected in fluid communication. In this way, the two volumes which are formed from the grooves 22, 122 and the grooves 24, 124 are acoustically coupled and can thus contribute to noise attenuation of the flowing fluid.

Alternatively or additionally, connection openings 128, also in slots, for example, but also formed differently, can also be arranged in the partition 26 of the resonator structure 20 at the element.

As can be seen in FIG. 2, the housing bottom part 114 comprises an outlet 130 of the resonator structure 120 at the housing for purified air which in this example is connected in fluid communication to the radially inwardly positioned one of the two grooves 122, 124 of the resonator structure 120 at the housing. For example, coupling to an air connector of a compressor can be realized through the outlet 130 for the noise attenuation.

Figure 4:
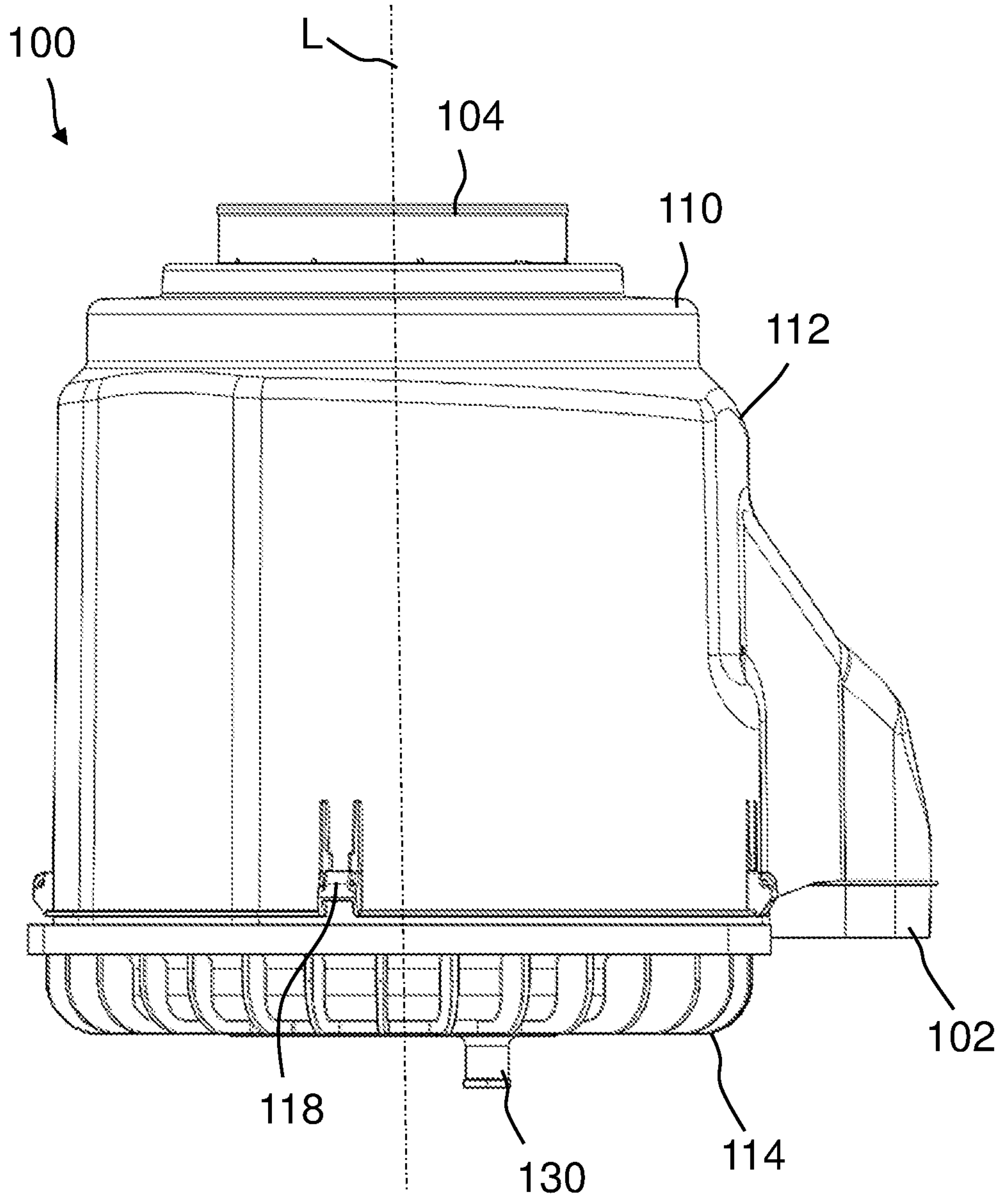
FIG. 4 shows a side view of the filter system of the FIGS. 2 and 3.

FIG. 4 shows a side view of the filter system 100 of the FIGS. 2 and 3. Housing top part 112 and housing bottom part 114 are joined and secured by means of the connection elements 118 arranged about the circumference. For an exchange of the filter element 10, the connection elements 118 can be released and the filter element 10 removed.

The fluid inlet 102 is arranged laterally at the housing top part 112. The fluid to be filtered flows through the filter bellows from an exterior side into the interior 30 and exits, filtered, from the filter housing 110 through the centrally arranged fluid outlet 104.

Figure 5:
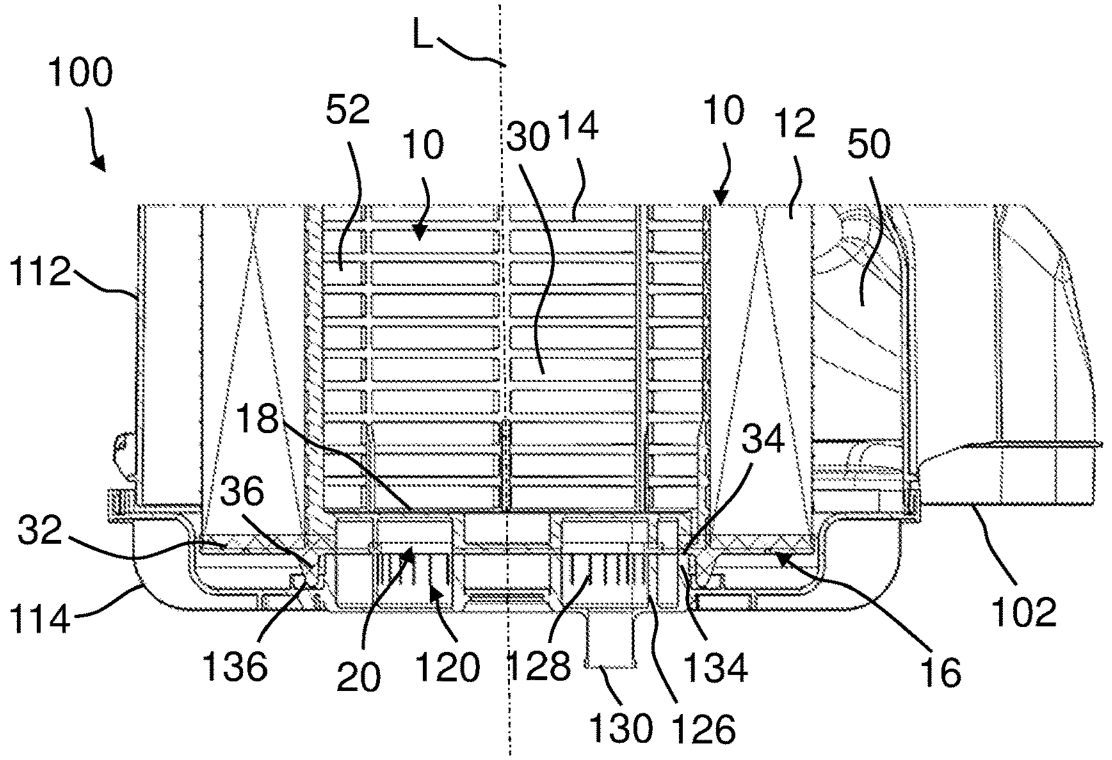
FIG. 5 shows a section illustration of the filter system in the region of the end disk of the filter element.
Figure 6:
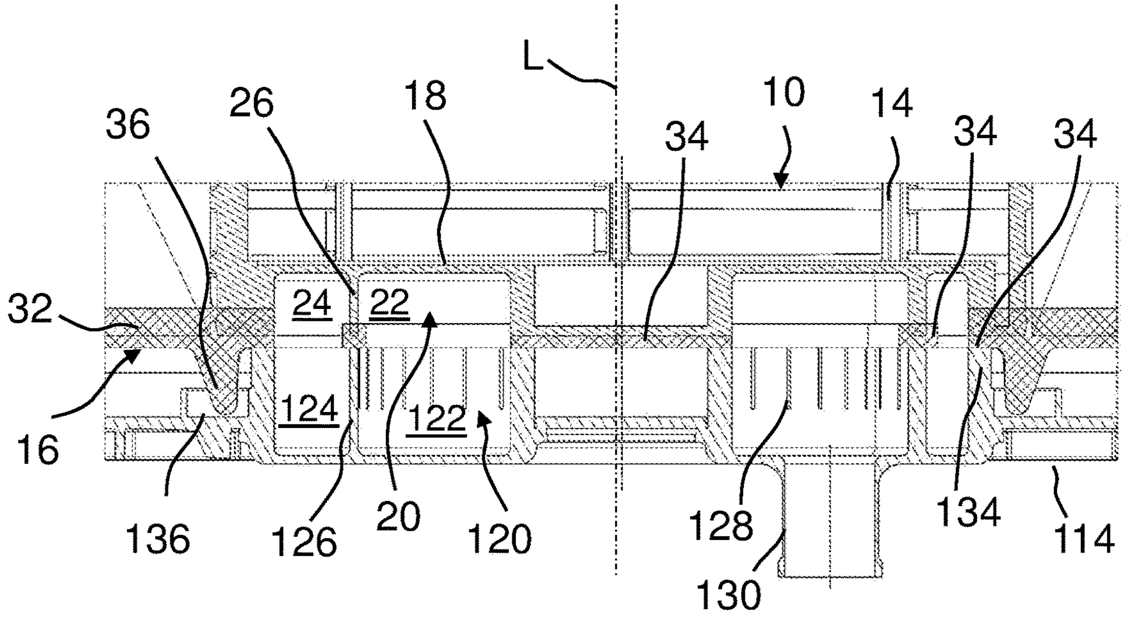
FIG. 6 and FIG. 7 show enlarged section illustrations of the filter system in the region of the resonator structures.
Figure 7:
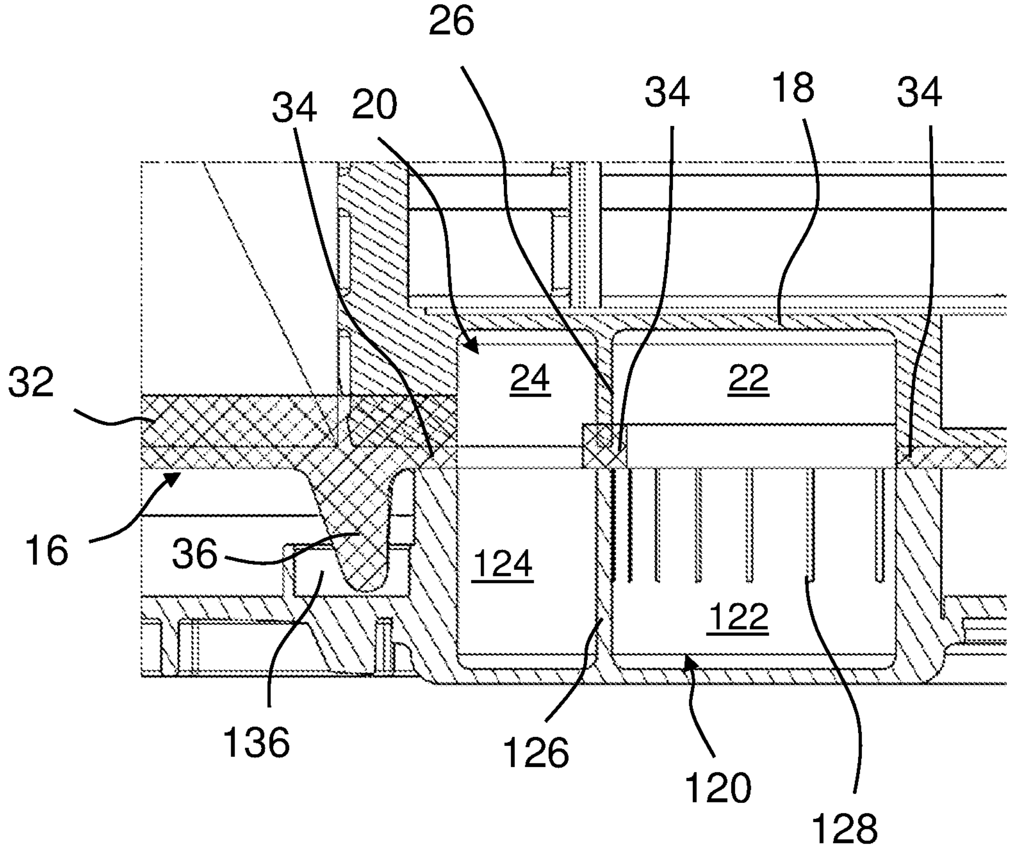

In FIG. 5, a section illustration of the filter system 100 in the region of the end disk 32 of the filter element 10 can be seen while in FIG. 6 and FIG. 7 an enlarged section illustration of the filter system 100 in the region of the resonator structures 20, 120 are illustrated.

The filter element 10 is arranged in the longitudinal axis L in the filter housing 110 and is seated with the support elements 36 arranged at the end disk 32 on the inner side 116 of the housing bottom part 114 for upright installation.

The fluid to be filtered, for example, air, passes through the fluid inlet 102 into the filter housing 110 and flows from the raw fluid region 50 from the exterior to the interior through the filter bellows 12 of the filter element 10 into the interior 30 which represents thus the clean fluid region 52. From this clean fluid region 52, the filtered fluid flows through the fluid outlet 104 out of the filter housing 110 again. The filter element 10 separates fluid-tightly the raw fluid region 50 from the clean fluid region 52 due to the sealed installation. The filter bellows 12 is supported by the central tube 14 against the pressure of the flowing fluid.

The two resonator structures 20, 120 are positioned opposite each other when the filter element 10 is installed so that the two grooves 22, 24 of the resonator 20 at the element forms a volume with the respective corresponding groove 122, 124 of the resonator structure 120 at the housing. The two volumes are separated by the partitions 26, 126 but are acoustically coupled through the connection openings 128 arranged in the partition 126.

The resonator structures 20, 120 are sealed relative to each other by the seal structure 34, which is formed in the end disk 32 and which interacts with the corresponding seal structure 134 of the housing bottom part 124 formed as a seal surface, and against the interior of the filter housing 110 and can thus advantageously fulfill their noise attenuation function. The seal structure 34 which is formed from the PUR foam of the end disk 32 can be seen in particular in the detail enlargements in FIG. 6 and FIG. 7.

REFERENCE CHARACTERS

10 filter element
12 filter bellows
14 central tube
16 end face
18 bottom
20 resonator structure at the element
22 groove
24 groove
26 partition
28 opening
30 interior
32 end disk
34 seal structure
36 support element
50 raw fluid region
52 clean fluid region
100 filter system
102 inlet
104 outlet
110 filter housing
112 housing top part
114 housing bottom part
116 inner side
118 connection element
120 resonator structure at the housing
122 groove
124 groove
126 partition
128 connection openings
130 outlet
134 seal structure
136 annular groove
L longitudinal axis

What is claimed is:

1. A filter element comprising:
a hollow cylinder-type filter bellows having an end face;
a bottom at the end face of the filter bellows, wherein the bottom is substantially closed;
at least one resonator structure formed on the substantially closed bottom of the filter element and configured to provide noise attenuation of a flowing fluid,
wherein the at least one resonator structure comprises two or more grooves formed on an outer side of the substantially closed bottom of the filter element and facing away from an interior of the filter element,
wherein the grooves are separated from each other by a partition;
wherein at least one of the grooves is connected in fluid communication through an opening extending through the substantially closed bottom of the filter element into the interior of the filter element;
wherein the at least one resonator structure, when the filter element is installed in a filter housing, is configured to seal tightly relative to a complementary resonator structure of the filter housing; and
wherein the grooves are connected in fluid communication through connection openings arranged in the at least one resonator structure of the filter element or arranged in the complementary resonator structure of the filter housing.

2. The filter element according to claim 1, further comprising
a central tube,
wherein the central tube comprises the substantially closed bottom of the filter element, and
wherein the central tube is arranged about a longitudinal axis of the filter element inside the filter bellows.

3. The filter element according to claim 1, wherein
the substantially closed bottom of the filter element comprises an end disk,
wherein the at least one resonator structure of the filter element is formed in the end disk.

4. The filter element according to claim 3, wherein the end disk comprises a seal structure configured to seal the at least one resonator structure of the filter element in relation to the complementary resonator structure of the filter housing, when the filter element is installed in the filter housing.

5. The filter element according to claim 1, wherein the grooves are segments arranged adjacent to each other.

6. The filter element according to claim 5, wherein the segments are circular ring segments.

7. The filter element according to claim 1, wherein the opening to the interior of the filter element is arranged in at least one of the grooves.

8. The filter element according to claim 1, wherein the partition is formed into the at least one resonator structure of the filter element and comprises one or more of the connection openings connecting the grooves in fluid communication.

9. The filter element according to claim 8, wherein the one or more connection openings of the partition are axially extending slots.

10. A filter system comprising:
a filter housing comprising at least a housing top part and a housing bottom part;
a filter element configured to be exchangeably arranged in the filter housing and comprising:
a hollow cylinder-type filter bellows surrounding an interior of the filter element, the filter bellows having an end face;
a bottom at an end face of the filter bellows, wherein the bottom is substantially closed;
at least one first resonator structure formed on the substantially closed bottom of the filter element and configured to provide noise attenuation of a flowing fluid, wherein the at least one first resonator structure comprises two or more grooves formed on an outer side of the substantially closed bottom of the filter element and facing away from the interior of the filter element, wherein the two grooves are separated from each other by a first partition;
wherein at least one of the two or more grooves is connected in fluid communication through an opening extending through the substantially closed bottom of the filter element into the interior of the filter element;
wherein the housing bottom part comprises an inner side and further comprises a second resonator structure complementary to the at least one first resonator structure of the filter element, wherein the second resonator structure is arranged at the inner side of the housing bottom part and comprises two grooves separated from each other by a second partition;

wherein the at least one first resonator structure of the filter element, when the filter element is installed in the filter housing, seals tightly relative to the complementary second resonator structure of the housing bottom part;

wherein the two grooves of the at least one first resonator structure are connected in fluid communication through connection openings arranged in the at least one first resonator structure of the filter element or arranged in the second resonator structure of the filter housing.

11. The filter system according to claim 10, wherein the connection openings are axially extending slots in the first partition and/or in the second partition.

12. The filter system according to claim 10, wherein the two grooves of the second resonator structure are segments arranged adjacent to each other.

13. The filter system according to claim 12, wherein the segments are circular ring segments.

14. The filter system according to claim 10, wherein a first one of the two grooves of the second resonator structure at least partially surrounds a second one of the two grooves of the second resonator structure.

15. The filter system according to claim 10, wherein the second resonator structure comprises an outlet for purified air arranged at the housing bottom part.

16. The filter system according to claim 15, wherein the outlet is connected in fluid communication to at least one of the two grooves of the second resonator structure.

17. The filter system according to claim 10, wherein the second partition comprises one or more of the connection openings.

18. The filter system according to claim 17, wherein the one or more connection openings of the second partition are axially extending slots.

19. The filter system according to claim 10, further comprising at least one seal structure arranged at one of the at least one first resonator structure and of the second resonator structure, wherein, when the filter element is installed as intended in the filter housing, the at least one seal structure seals the at least one first resonator structure and the second resonator structure in relation to the interior of the filter element.

20. The filter element according to claim 6, wherein the two or more grooves formed as circular ring segments are arranged adjacent to each other on the substantially closed bottom of the filter element, and wherein a first one of the two or more grooves at least partially surrounds at least a second one of the two or more grooves in a radial direction relative to a longitudinal axis of the filter element.

21. The filter element according to claim 10, wherein the first one of the two or more grooves is nested radially inside of the second one of the two or more grooves, nested radially relative to the longitudinal axis.

* * * * *